United States Patent
Kung (10) Patent No.: US 8,872,485 B1
(45) Date of Patent: Oct. 28, 2014

(54) CIRCUIT AND DEVICE FOR INCREASING POWER SUPPLY HOLD-UP TIME

(75) Inventor: Steven F. Kung, Portland, OR (US)

(73) Assignee: Maxim Integrated Products, Inc., San Jose, CA (US)

( * ) Notice: Subject to any disclaimer, the term of this patent is extended or adjusted under 35 U.S.C. 154(b) by 837 days.

(21) Appl. No.: 12/728,215

(22) Filed: Mar. 20, 2010

Related U.S. Application Data (60) Provisional application No. 61/162,228, filed on Mar. 20, 2009.

(51) Int. Cl.
   *H02M 3/156* (2006.01)

(52) U.S. Cl.
   USPC ............... 323/222; 323/259; 323/282

(58) Field of Classification Search
   USPC .......... 323/222–225, 271, 282, 259, 344, 351
   See application file for complete search history.

(56) References Cited

U.S. PATENT DOCUMENTS

| | | | |
|---|---|---|---|
| 5,134,355 A * | 7/1992 | Hastings | 323/211 |
| 2002/0140410 A1* | 10/2002 | Rothleitner et al. | 323/282 |
| 2005/0030772 A1* | 2/2005 | Phadke | 363/71 |
| 2005/0281057 A1* | 12/2005 | Jung et al. | 363/15 |
| 2006/0176035 A1* | 8/2006 | Flatness et al. | 323/282 |
| 2007/0262764 A1* | 11/2007 | Warita et al. | 323/284 |
| 2009/0066301 A1* | 3/2009 | Oswald et al. | 323/271 |
| 2009/0267580 A1* | 10/2009 | Derksen | 323/282 |
| 2009/0315401 A1* | 12/2009 | Yoshida et al. | 307/44 |
| 2010/0039080 A1* | 2/2010 | Schoenbauer et al. | 323/234 |

\* cited by examiner

*Primary Examiner* — Adolf Berhane
*Assistant Examiner* — Gustavo Rosario Benitez
(74) *Attorney, Agent, or Firm* — TIPS Group (57) ABSTRACT

In an embodiment, set forth by way of example and not limitation, a circuit for increasing power supply hold-up time includes an inductor, two capacitors and a controller. A first capacitor has a first node coupled to a first node of the inductor and has a second node coupled to ground. A second capacitor has a first node coupled to a second node of the inductor and has a second node coupled to ground. The controller is preferably operative to direct current through the inductor such that the inductor can serve as a Boost inductor for the second capacitor and a Buck inductor for the first capacitor.

13 Claims, 8 Drawing Sheets

CIRCUIT AND DEVICE FOR INCREASING POWER SUPPLY HOLD-UP TIME

CROSS REFERENCE TO RELATED APPLICATIONS

This application claims the benefit of U.S. Ser. No. 61/162,228 filed Mar. 20, 2009, incorporated herein by reference in its entirety.

BACKGROUND

Example embodiments disclosed herein pertain to electrical and electronic circuitry. More particularly, example embodiments disclosed herein pertain to the provision of power to electronic circuitry.

Low-voltage DC-powered microelectronics system generally require additional hold-up time after loss of system power. Examples include but not are not limited to: Solid State Drives ("SSD"), PCI and PCI Plug-in Cards. "Hold-up time" is defined herein as that interval of time between when system DC input power is lost until the energy storage within the system is unable to continue system operation.

During hold-up time, a device receives a signal or "alert" that indicates that there is a reduction in power and thus that it is necessary to perform any tasks which must be completed before there is a complete loss of power. Such tasks include, for example, the transfer of data in volatile storage to non-volatile storage. The voltage needed to perform these tasks is generally provided by a capacitor which stores energy during normal operation so that it can become a secondary supply of power during the hold-up time.

The SSD market is a rapidly expanding market competing against Hard Disk Drives ("HDD") as the next-generation memory storage solution. SSD's high speed, high reliability, and high resilience against environmental stresses, such as shock and vibration, as compared to HDDs enable highly mobile and ruggedized applications. As personal communications and computing devices become more mobile, products look to SSDs as a preferred memory solution technology. However, SSDs are more sensitive to power loss than HDDs, making an adequate hold-up time important to the use of such devices.

Figure 1:
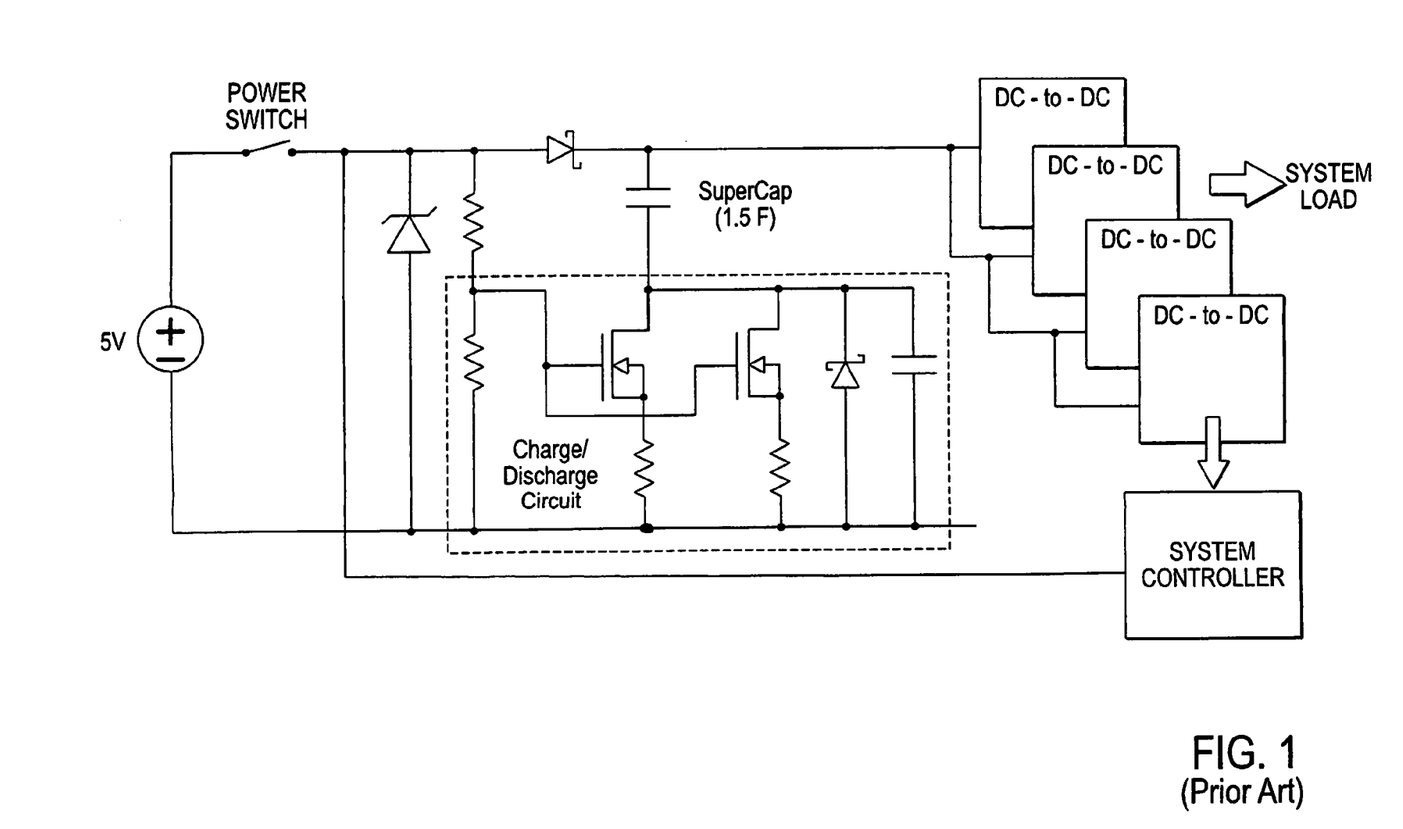
FIG. 1 is a block diagram of a prior art apparatus for increasing hold-up time of an electronic circuit after an interruption of power.

FIG. 1 is a circuit diagram depicting a hold-up circuit of the prior art which utilizes a very large capacitor known as a "SuperCap." In this particular example, the SuperCap is approximately 1.5 Farads. The SuperCap is charged by the input voltage, 5 volts in this case, through a charging diode. When the input voltage is removed, e.g. by opening the power switch, the SuperCap continues to supply power to the system's DC-to-DC converters for a hold-up period so that the system can be powered down gracefully.

A problem with SuperCap hold-up circuits is that the SuperCaps are physically large and are quite expensive. Furthermore, SuperCaps are rather inefficient with respect to their charge-to-voltage (CV) volume. This results in a low hold-up Cap Voltage and therefore has very limited discharge voltage excursion as set forth by the equation:

$$E = \frac{1}{2}C(V_2^2 - V_1^2)$$

Figure 2:
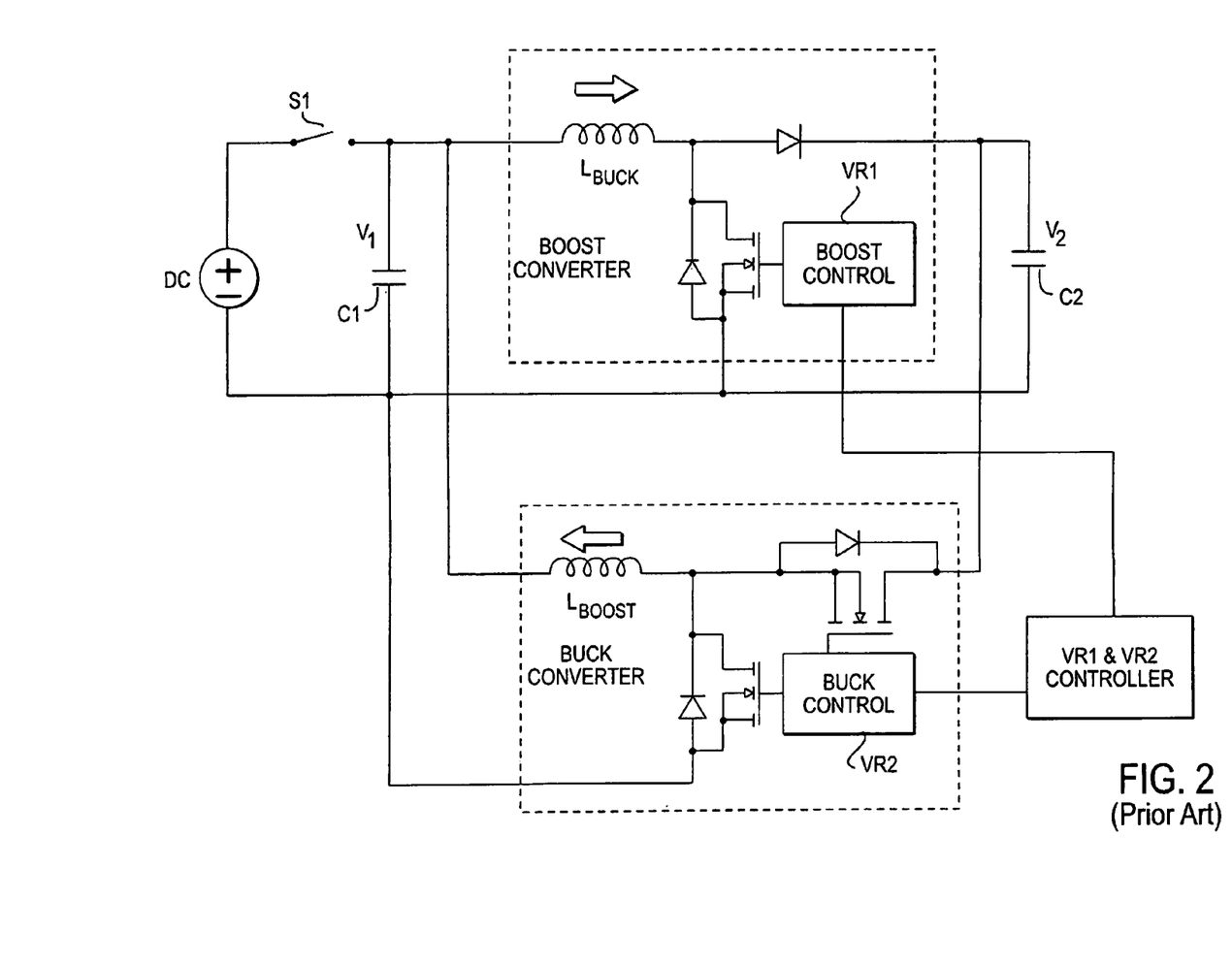
FIG. 2 is a block diagram of another prior art apparatus for increasing hold-up time of an electronic circuit after an interruption of power.

FIG. 2 is a circuit diagram depicting another hold-up circuit of the prior art. This circuit uses separate boost converter and buck converter circuits as indicated by the broken lines. The Boost converter circuit charges capacitor C2 during normal operation so that it can become a secondary supply of power during hold-up time. The charging of capacitor C2 is performed via a Boost inductor which converts power from a lower voltage to a higher voltage. A Boost controller VR1 is used to control the rate of energy transfer into C2 by switching a field effect transistor (FET) on and off.

During hold-up time, power from C2 is used to maintain capacitor C1 at a prescribed voltage. The power is converted from a higher voltage to a lower voltage via a Buck inductor. The energy transfer is controlled by Buck controller VR2 which controls two FETs to control the rate at which energy is transferred. The two controllers VR1 and VR2 are controlled by a system controller which activates VR1 and VR2 accordingly.

Unfortunately, prior art implementations of hold-up circuits such as the one illustrated are expensive in terms of part costs and tend to be bulky due to their many (and sometimes large) components. What is needed is a hold-up circuit which reduces overall costs, has a small form-factor and reacts to the dynamically changing power environment present in devices like SSDs and others.

These and other limitations of the prior art will become apparent to those of skill in the art upon a reading of the following descriptions and a study of the several figures of the drawing.

SUMMARY

Certain embodiments are summarized below to illustrate certain aspects of the apparatuses and methods disclosed herein. These embodiments are set forth by way of example and not limitation.

In an embodiment, set forth by way of example and not limitation, a circuit for increasing power supply hold-up time includes an inductor, two capacitors and a controller. A first capacitor has a first node coupled to a first node of the inductor and has a second node coupled to ground. A second capacitor has a first node coupled to a second node of the inductor and has a second node coupled to ground. The controller is preferably operative to direct current through the inductor such that the inductor can serve as a Boost inductor for the second capacitor and a Buck inductor for the first capacitor.

In an embodiment, set forth by way of example and not limitation, a method for increasing power supply hold-up time includes flowing current through an inductor in a Boost direction in a Boost mode to increase a voltage on an energy storage capacitor and flowing current from the energy storage capacitor through the inductor in a Buck direction in a Buck mode to maintain a voltage on a power supply capacitor. In an additional embodiment, it is determined when the current flowing through the inductor should be in a Boost mode and when it should be in a Buck mode.

In an embodiment, set forth by way of example and not limitation, a Boost/Buck controller comprises an integrated circuit including a first input pin for sensing a first voltage and a second input pin for sensing a second voltage. The integrated circuit preferably includes logic responsive to the first voltage and the second voltage and operative to develop a first control signal and a second control signal that are related by a ratio.

An advantage, set forth by way of example and not limitation, is that certain embodiments provide a hold-up function with fewer, less expensive and less bulky components than are required by the prior art.

Another advantage, set forth by way of example and not limitation, is that certain embodiments react to the dynamically changing power environment present in devices like SSDs and others.

These and other embodiments and advantages disclosed herein will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit. The drawings include the following figures.

DETAILED DESCRIPTION OF EXAMPLE EMBODIMENTS

Figure 3:
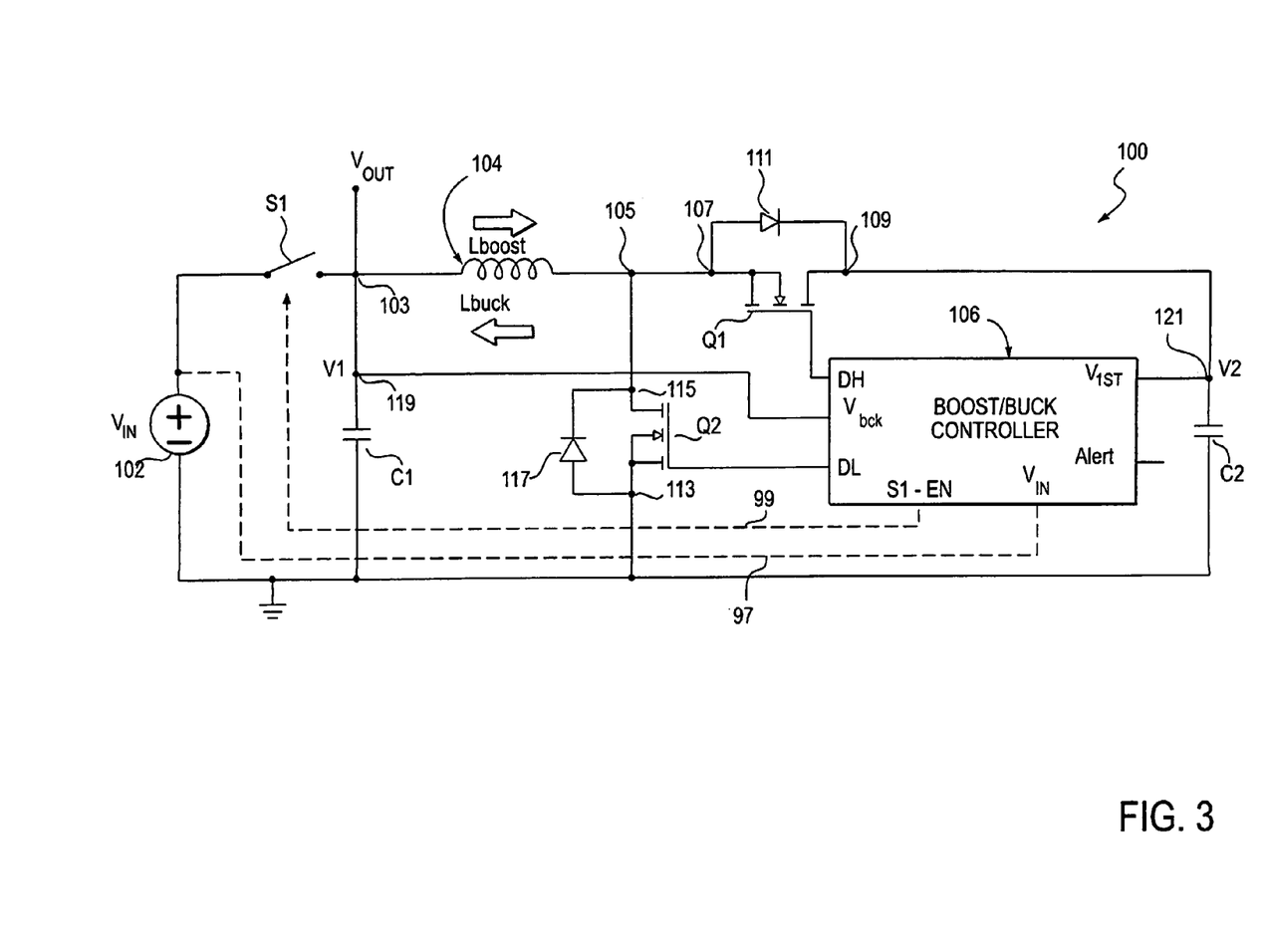
FIG. 3 is a block diagram of an embodiment of an example apparatus as disclosed herein for increasing hold-up time of an electronic circuit after an interruption of power.

FIGS. 1 and 2 were described with respect to the prior art. FIG. 3 is a block diagram depicting an example hold-up circuit 100 coupled to a DC power source 102. In this example embodiment, the power source 102 may be a typical 5 volt DC power supply. It will be appreciated that other power source voltages are common, and that 5 volts is just an example. It will also be appreciated different power source voltages may result in a change of the other voltages in the circuit (for example voltage thresholds). Therefore, the various voltage levels as described herein are for the purpose of example and not limitation.

DC power source 102, in this example embodiment, is coupled at its positive lead to a switch S1 and at its negative lead to ground. Switch S1 is coupled to a first lead of a bidirectional Boost/Buck inductor 104 at a node 103. A capacitor C1 ("power supply capacitor" in this example) is coupled between node 103 and ground. $V_{OUT}$ for the system being powered can be taken, for example, from node 103.

A second lead of bidirectional Boost/Buck inductor 104 is coupled to a node 105. Also coupled to node 104 is a source node 107 of an N-channel FET Q1. Of course, N-channel FET Q1 is but one example of an electronic "valve" which can be used to vary the flow of current. As used herein, a "valve" can be one of a variety of devices which can be electrically controlled to vary the amount of current flowing through it.

A drain node 109 of FET Q1 is coupled to a first lead of a capacitor C2 ("energy storage capacitor" in this example) which, during operation of the circuit 100, is maintained at a higher voltage level than capacitor C1. A second lead of capacitor C2 is coupled to ground. Capacitor C2 can be, for example, 100-270 μF for a 3-5 ms hold-up at 8 watts, where V1=4.6V. An equivalent diode 111, which is the intrinsic body diode of FET Q1, has its anode coupled to node 107 and its cathode coupled to node 109. When FET Q1 is turned on ("ON") by applying a sufficient voltage to its gate, current can flow freely through it with relatively little resistance. When FET Q1 is turned off ("OFF") a limited amount of current can flow from inductor 104 to capacitor C2.

In this example embodiment circuit 100 also includes an N-channel FET Q2 coupling node 105 to ground. An anode of a diode 117, which is the intrinsic body diode of FET Q2, is coupled to a node 113 and a cathode of diode 117 is coupled to a node 115. When FET Q2 is ON current can freely flow through it with relatively little resistance and when FET Q2 is OFF a limited amount of current can flow.

Controller 106 includes an output DH which is coupled to a control input or gate of FET Q1. Output DH allows the controller to turn FET Q1 ON and OFF. Controller 106 also includes an output DL which is coupled to a control input or gate of FET Q2 to allow controller 106 to turn FET Q2 ON and OFF. Controller 106 also includes an input Vbck which is coupled to a node 119 of capacitor C1. This allows controller 106 to sense the voltage V1 at capacitor C1 which is equipotential with node 103. Controller 106 further has an input Vbst coupled to a node 121 of capacitor C2. This allows controller 106 to sense the voltage V2 at capacitor C2 which is equipotential node 109.

It will be appreciated that controller 106 may be implemented as an integrated circuit device having a package enclosing an integrated circuit chip. The package includes a number of pins which electrically connect with the integrated circuit chip which include, for example, power, ground and input/output pins.

By way of non-limiting example, the pins of controller 106 when implemented as an integrated circuit can include a first input pin for sensing a first voltage (e.g. V1) and a second input pin for sensing a second voltage (e.g. V2). The semiconductor chip of controller 106, in this example, includes logic responsive to the first voltage V1 and the second voltage V2 and can develop a first control signal (e.g. DH) and a second control signal (e.g. DL) at, for example, a predetermined ratio DH/DL. The controller 106 can also be provided with a first output pin coupled to the first control signal and a second output pin coupled to the second control signal. Alternatively, the semiconductor chip of controller 106 can include a first FET controlled by the first control signal and a second PET controlled by the second control signal, the first FET being coupled to a first pair of output pins (not shown) and the second FET being coupled to a second pair of output pins (not shown). That is, in certain embodiments, FET Q1 and FET Q2 are part of the semiconductor chip rather than separate components. The controller 106 can also include a third input pin for sensing power supply voltage levels and a third output pin for controlling a power switch, such as switch S1.

As will be readily understood by those of skill in the art, the logic of the semiconductor chip can be implemented in various digital technologies including discreet logic, state machines and microprocessors. Alternate embodiments may implement the logic with analog and/or digital technologies. For example, voltage comparators and clocked digital logic can be used to implement the processes of the controller 106.

The example processes embodied in example controller 106 switch between a Boost mode for capacitor C2 and a Buck mode for capacitor C1 as needed. This is achieved by sensing voltages V1 and V2 at inputs Vbck and Vbst, respectively, of controller 106 and applying signals to FET Q1 and FET Q2 from outputs DH and DL, respectively, of controller 106 to manage the energy flow between capacitors C1 and C2. These processes of controller 106 will be described in more detail below.

By way of example, but not limitation, for a $V_{IN}$ of approximately 5 volts, and a desired V1 of at least 4.8 volts ("a threshold voltage level"), and with C2 charged to approximately 25 volts, the following process can be used. If V1 is greater than 4.8 volts, the circuit is in a Boost mode (i.e. the current flows through the inductor in a Boost direction as indicated to the arrow pointing to the right in FIG. 3 in this example embodiment). where the capacitor C2 attains the charge V2=25 volts. At this time, either the DH output of the controller 106 is set to OFF and DL is controlled to regulate V2 or the DH/DL ratio can be controlled to regulate V2. However, if V1 drops below 4.7 volts (e.g. "less than the threshold level" or "a second threshold level"), the circuit is in a Buck mode where current flows from C2 to C1 (i.e. the current flows through the inductor in a Buck direction as indicated by the arrow pointing to the left in FIG. 3 in this example embodiment). Preferably V1 is regulated to remain at 4.6 volts in this mode by controlling the DH/DL ratio. Also, an under-voltage alert is preferably set to alert the system to begin an orderly shut-down.

Figure 4:
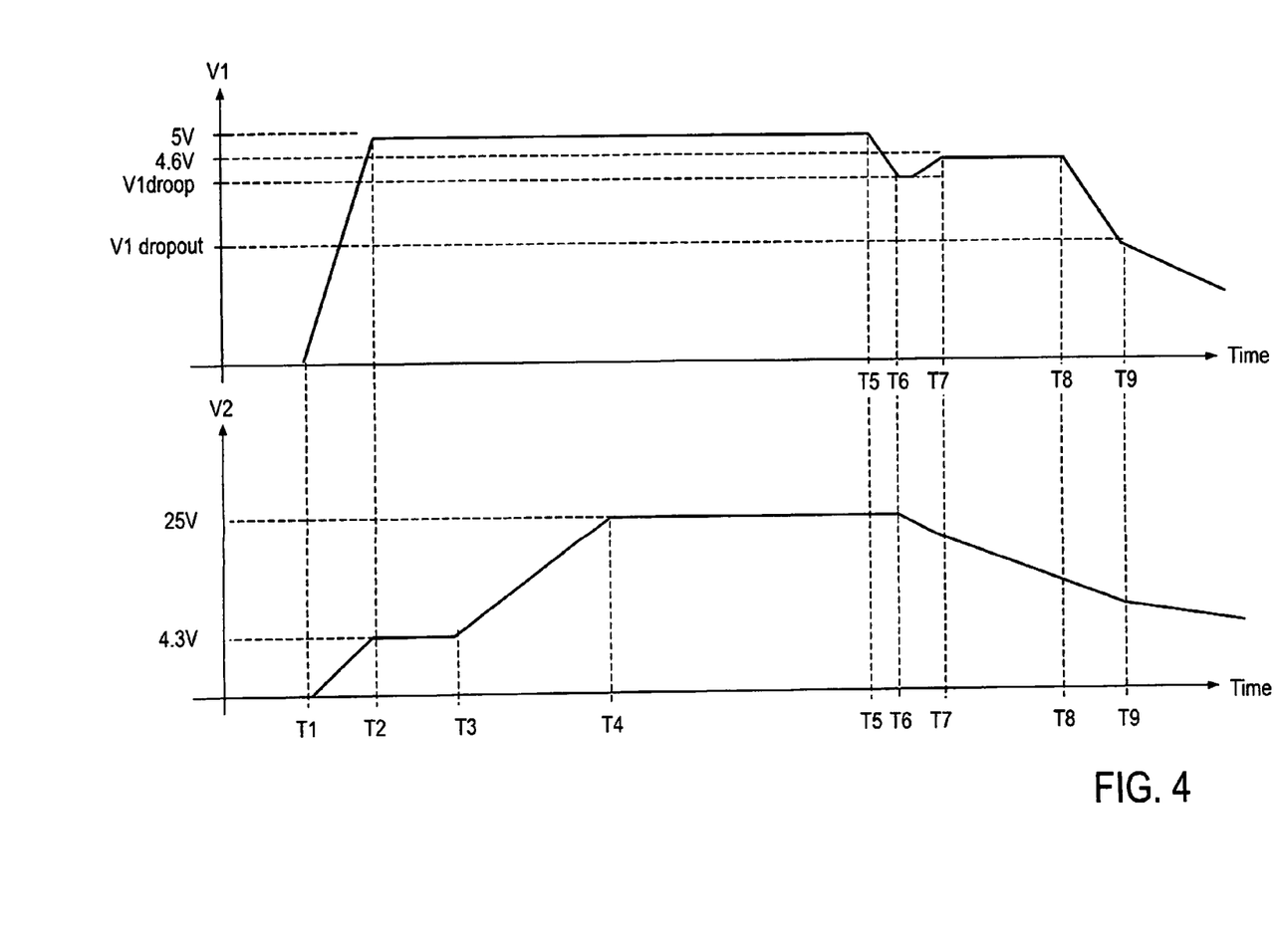
FIG. 4 is a graph illustrating an example operating process of the embodiment of FIG. 3.

FIG. 4 is an example timing diagram depicting the power sequencing for V1 and V2 of FIG. 3. The diagram is not to scale and is provided solely for the purpose of example and not limitation. At time T1, the host power is switched onto V1, and C1 is charged through a soft-start. During the time interval T1-T2 C2 charges up through the body diode of FET Q1. At T2, V1 reaches regulation level sourced by host.

T3 is the target turn-on ("ON") point of a Boost operation through control of enable pin. Also, in an alternative example embodiment, the Boost mode can optionally default to be always ON, in which case Boost action will begin when V1>UVLO. During the interval T3-T4, a Boost occurs from V1 to V2, charging up C2. At T4, V2 reaches regulation level set by controller.

During the interval T4-T5, C2 remains regulated via a Boost operation. At T5, host power is removed, and C1 becomes discharged by downstream DC-to-DC devices. At 16, the controller senses V1 has dropped below host power regulation level. A Buck operation begins from V2 to V1. C1 is replenished by energy stored in C2. At T7, host power still disconnected. V1 reaches regulation level set by controller. This regulation level is less than V1 level when host is present. At T8, V1 is regulated by controller Buck action from V2 to V 1. V1 regulation level allows downstream DC-to-DC devices to stay in regulation.

During the interval T7-T8, V1 regulated by controller Buck action from V2 to V1. V1 regulation level allows downstream DC-to-DC devices to stay in regulation. At F8, C2 discharges to a level where V1 can no longer stay in regulation. At T9, C1 discharges to level where downstream DC-to-DC devices drop out.

Figure 5:
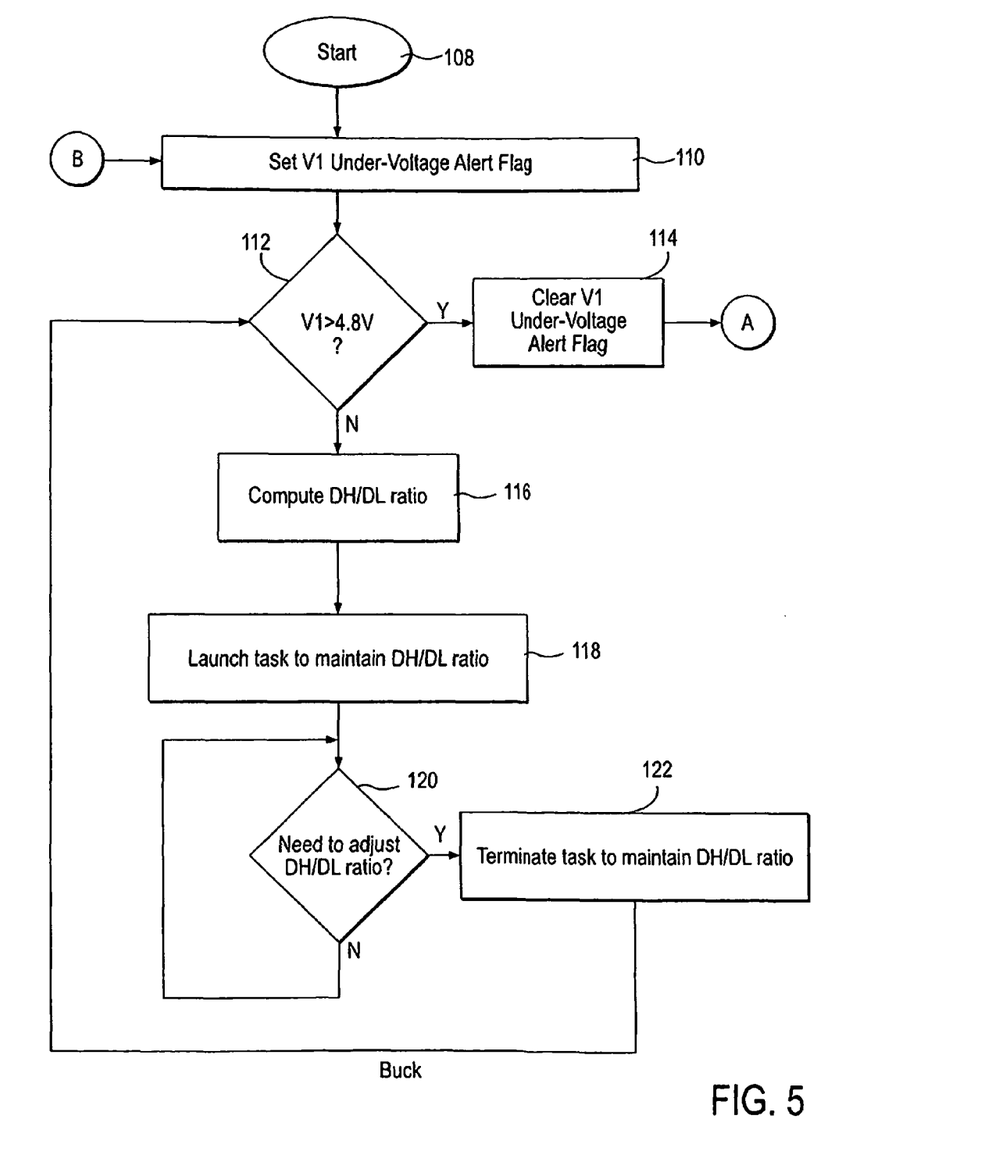
FIG. 5 is a flow diagram of an example Buck process.

FIG. 5 is a flow diagram depicting an example Buck process designed to maintain the V1 voltage level after loss of power. With additional reference to FIG. 3, the process begins in an operation 108 and continues with an operation 110 in which a V1 Under-Voltage Alert Flag is set. Next, a conditional operation 112 determines whether the voltage V1 is greater than 4.8V, and if so, the V1 Under-Voltage Alert Flag is cleared in an operation 114 and process control continues with the Boost process depicted in FIG. 6, to be described in greater detail subsequently. Again, the voltage levels described herein are by way of example and not limitation.

If it is determined that V1 of FIG. 3 is not greater than 4.8V (in this example), then control passes to an operation 116 which computes a DH/DL ratio that is suitable to achieve the desired voltage regulation. Then in an operation 118 a task is launched which in certain example embodiments maintains the DH/DL ratio. Next, in a conditional operation 120, it is determined whether or not the current DH/DL ratio needs to be adjusted. This is done using feedback regarding voltages V1 and V2 as applied to controller inputs Vbck and Vbst respectively.

If the energy transfer rate achieved by the present DH/DL ratio is correct, operation 120 is invoked again. Note that the timing of this operation must be such that the task launched in operation 118 is not prematurely terminated before it can control DH and DL sufficiently to approximately produce the specified ratio. If it is determined in operation 120 that the energy transfer rate achieved by the present DH/DL ratio is not correct, or V1 of FIG. 3 has is greater than 4.8V, an operation 122 is invoked. Operation 122 terminates the task to maintain the DH/DL ratio. The process then continues with operation 112.

Figure 6:
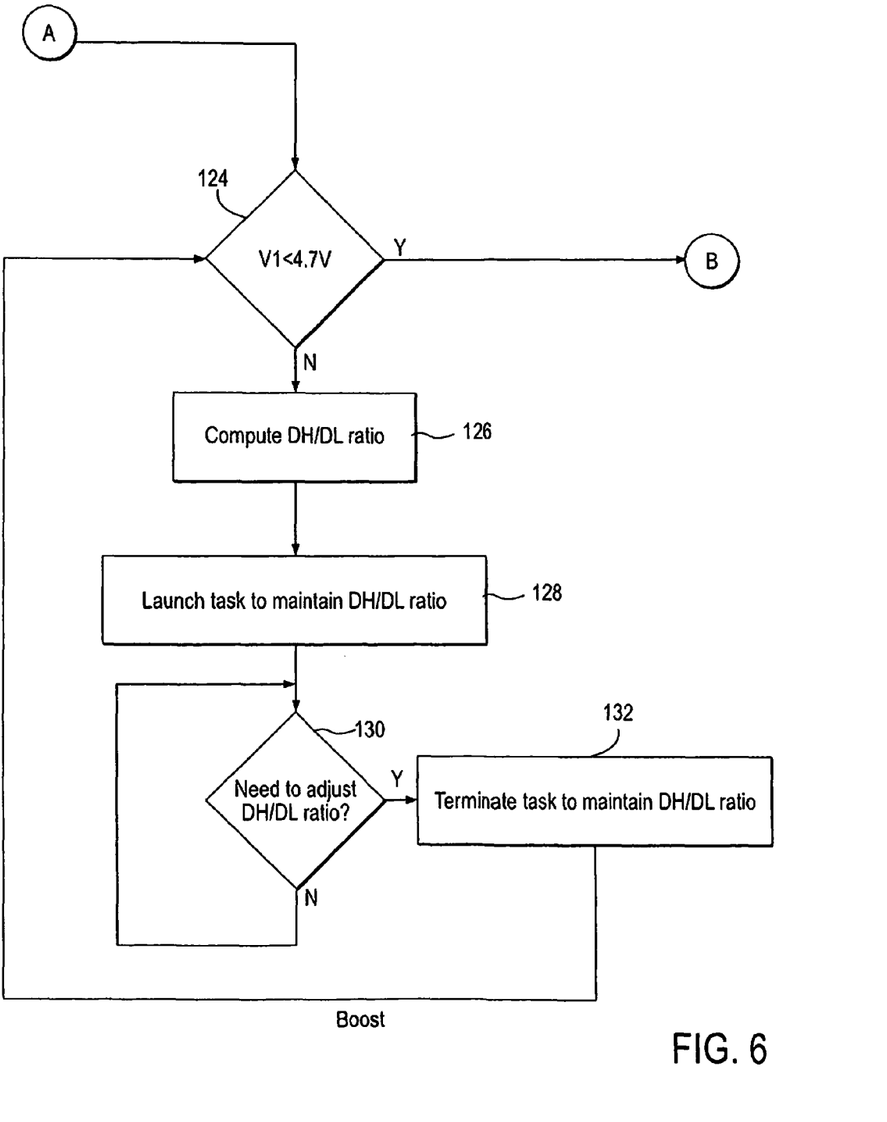
FIG. 6 is a flow diagram of an example Boost process.

FIG. 6 is a flow diagram depicting an example Boost process which, in certain example embodiments, regulates V2 at a fixed voltage. With continuing reference to FIG. 3, the operation begins in a conditional operation 124 which determines whether V1 of is less than 4.7V (in this example), and if so, processing continues at B of FIG. 5. If it is determined that V1 is not less than 4.7V, then control passes to an operation 126 which computes a DH/DL ratio that is suitable to achieve the desired voltage regulation. Then, in an operation 126 a task is launched which in certain example embodiments maintains the DH/DL ratio.

Next, in a conditional operation 130, it is determined whether or not the current DH/DL ratio needs to be adjusted. This is done using feedback regarding voltages V1 and V2 applied to inputs Vbck and Vbst, respectively, of controller 106. If the DH/DL ratio energy transfer rate achieved by the present DH/DL ratio is correct, operation 130 is invoked again.

In an example embodiment, it may be preferred that the timing of the operation are such that the task launched in operation 128 is not prematurely terminated before it can control DH and DL sufficiently to approximately produce the specified ratio. If the energy transfer rate achieved by the present DH/DL ratio is not correct, or V1 of FIG. 3 has dropped below 4.7V, an operation 132, in this example, is preferably invoked. Operation 132 terminates the task to maintain the DH/DL ratio. The process then continues with operation 124.

Figure 7:
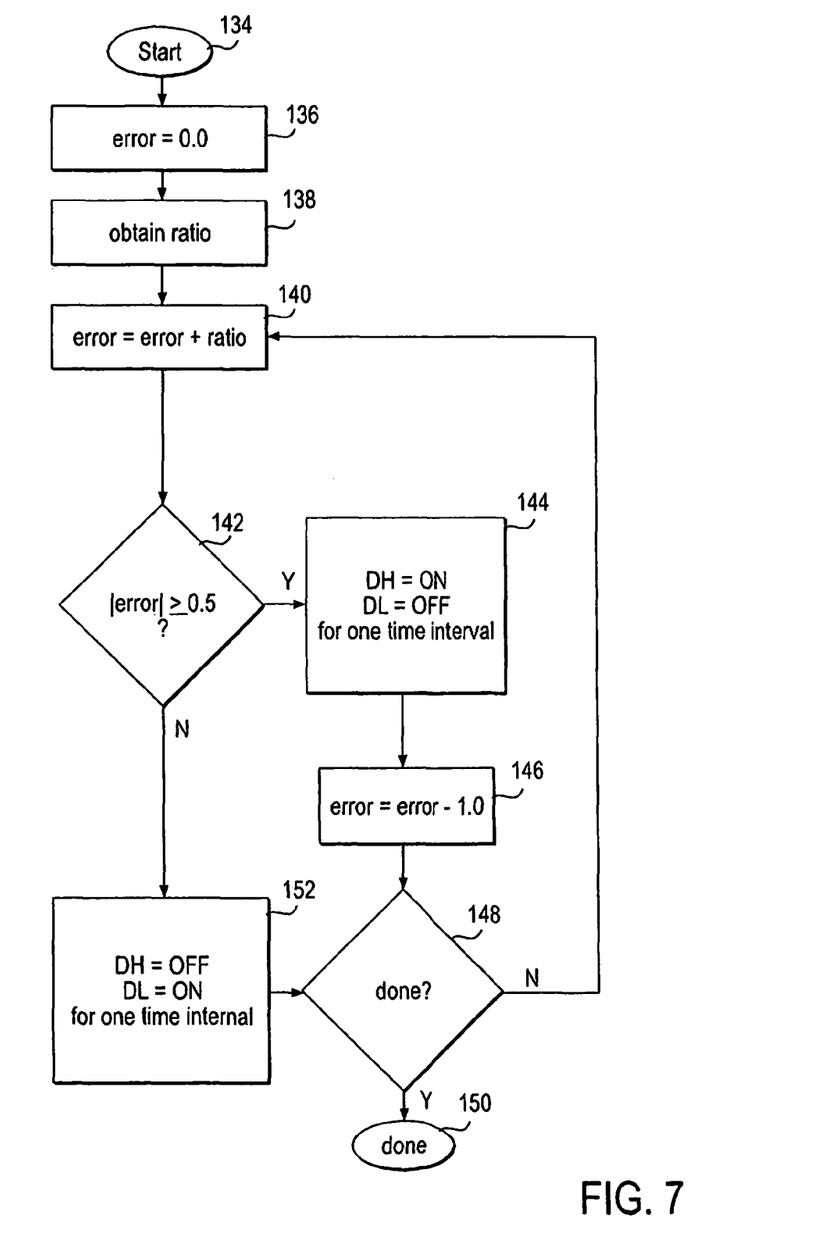
FIG. 7 is a flow diagram of an example process for maintaining a ratio.

FIG. 7 is a flow diagram depicting an example Maintain DH/DL Ratio process. The purpose of the Maintain DH/DL Ratio process, in certain example embodiments, is to control the DH and DL outputs of controller 106 of FIG. 3 such that the ratio between the time DH is on and the amount of time DL is on (the two being mutually exclusive with respect of their "ON" state in this example embodiment) is held to a specific ratio, with minimal deviation from that ratio. The process turns on one or the other for a fixed time interval, and then re-evaluates its state. Persons of skill in the art will appreciate that the fixed time interval are preferably long enough to allow the components associated with the DH and DL outputs to settle to reflect the current DH and DL state and to perform their function.

The process begins in an operation 134 and continues in an operation 136 wherein an error variable is set to equal 0.0. Then in an operation 138 a ratio is derived from the DH/DH ratio such that the ratio used in this process is expressed in terms of a ratio of time that DH should be "ON". The DH/DL ratio is provided by the operation that launched the present process (for example, operation 118 of FIG. 5 or operation 128 of FIG. 6).

Next, in an operation 140, the DH/DL ratio is added to the error variable. Then, a conditional operation 142 compares the absolute value of the error variable to the number 0.5 and if it is found to be greater than or equal to 0.5, processing continues in an operation 144 which sets DH to "ON", sets DL to "OFF" and holds these settings for a fixed time interval. It will be appreciated by persons of skill in the art that power transfer will occur during this time interval between capacitors C1 and C2 of FIG. 3.

Next in an operation 146 the number 1.0 is subtracted from the present value of the error variable, and the result is stored back into the error variable. Then in a conditional operation 148, a determination is made whether the process of FIG. 7 should be terminated. For example, the processes of FIGS. 4 and 5 will sometimes terminate the process of FIG. 7 so that, for example, a different mode may be entered, or a different DH/DL ratio may be selected. If it is determined in operation 148 that the process of FIG. 7 should be terminated, the process is concluded in an operation 150.

If in conditional operation 148, it is determined that the process of FIG. 7 should not be terminated, then processing continues with operation 140. If, in conditional operation 142, it is determined that the absolute value of the error variable is not greater than or equal to the number 0.5, the process continues with operation 152. Operation 152 sets DH to "OFF", sets DL to "ON" and holds these settings for a fixed time interval. It will be appreciated by persons of skill in the art that power transfer will occur during this time interval between capacitors C1 and C2 of FIG. 3.

With returning reference to FIG. 3, in an alternate embodiment the controller 106 is provided with a third input $V_{IN}$ and a third output SI-EN. Input $V_{IN}$ is coupled to the positive terminal of power source 102 by a line 97 and the output SI-EN is coupled to switch S1 (which in this embodiment is an electrically controllable switch) by a line 99. This embodiment is useful for applications where, after a failure of the power, it is required that the switch S1 be opened. This embodiment works substantially as described above, with a few additions. With this embodiment, switch S1 is opened when $V_{IN}$ drops below a threshold before the circuit enters the Buck mode. When $V_{IN}$ exceeds the threshold, switch S1 can be closed.

Figure 8:
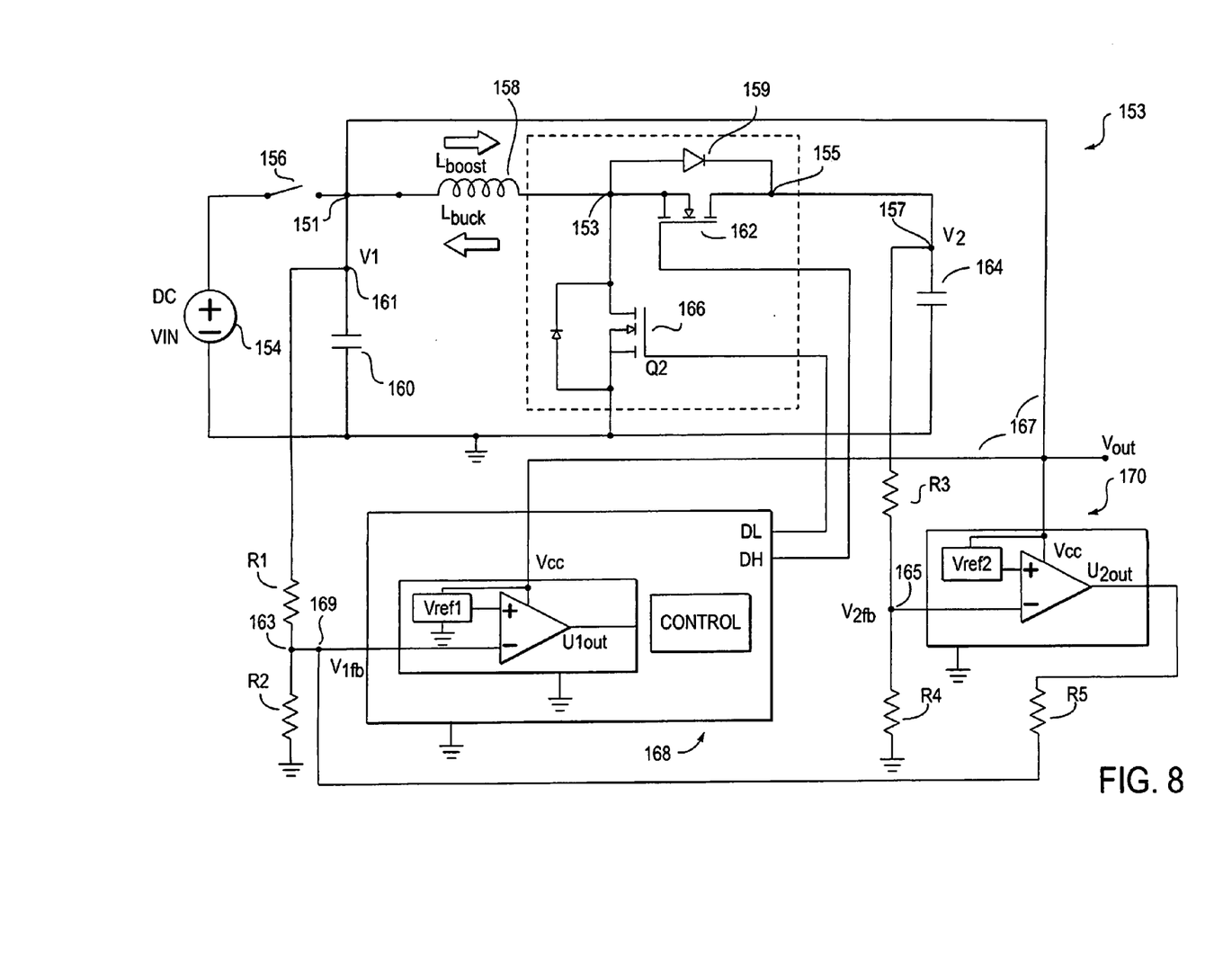
FIG. 8 is a block diagram of an alternative example embodiment.

FIG. 8 is a block diagram of another example embodiment of a hold-up circuit 153 which utilizes a "conventional" Buck controller as part of its circuitry. In this example embodiment, a positive lead of DC power source 154 is coupled to a switch 156 and its negative lead is coupled to ground. Switch 156 is coupled to a first lead of a bidirectional Boost/Buck inductor 158 at a node 151. A capacitor 160 is coupled between node 151 and ground. A second lead of bidirectional Boost/Buck inductor 158 is coupled to a node 153 which is also coupled to a source of an N-channel FET 162.

A drain of a first FET 162 is coupled to a node 155. A capacitor 164 has a node 157 which is coupled to, and equipotential with, node 155. Capacitor 164, during operation, has a voltage level V2 which is generally higher than the voltage V1 on capacitor 160 due to the voltage Boost provided by inductor 158. The remaining lead of capacitor 164 is coupled to ground. When FET 162 is ON, current can flow through it freely and with minimal resistance and when FET 162 is OFF a smaller amount of current can flow from inductor 158 to capacitor 164 via the body diode of FET 162. A second FET 166 is coupled between node 153 and ground. When FET 166 is ON current can flow through it freely and with minimal resistance, and when FET 166 is OFF a smaller current can flow from the node 153 to ground.

A voltage divider including the series connection of a resistor R1 and a resistor R2 is coupled between a node 163 of capacitor 160, which is equipotential with node 151, and ground. A conventional Buck controller 168, the design and implementation of which is well known to those of ordinary skill in the art, is coupled to a node 163 between resistors R1 and R2 at an input V1fb. Conventional Buck controller 168 is coupled to ground and derives its power at a Vcc input coupled to a node 151 by a line 167. DH and DL control outputs of conventional Buck controller 168 are coupled to the gates of FET 162 and FET 166, respectively, to control their ON/OFF states.

A voltage divider including the series connection of a resistor R3 and a resistor R4 is coupled between node 157 of capacitor 164, which is equipotential with node 155, and ground. An open drain O/P 170 is coupled to a node 165 between resistors R3 and R4 at an input V2fb. O/P 170 is coupled to ground and derives its power at a Vcc input coupled to node 151 by line 167. A U2out output of open drain O/P 170 is coupled to a node 169, which is equipotential with node 163, by a resistor R5.

An example of the operation of example hold-up circuit 153 will be discussed below. The definitions of the various variables referenced in the descriptions below are as follows:

V1=voltage at capacitor 164
V2=voltage at capacitor 160
V1bck_reg=V1 regulation voltage level of the Buck converter from V2 to V1
V1nom=nominal V1 level when S1 is closed
V2nom=nominal V2 level of the Boost converter from V1 to V2
V1fb=voltage at node coupling R1 and R2
V2fb=voltage at node coupling R3 and R4
Vref1=reference voltage for conventional Buck controller 168
Vref2=reference voltage for Open Drain O/P 170
DH=ON duty cycle of Q1-gate
DL=ON duty cycle of Q2-gate
DH_max=maximum ON duty cycle of Q1-gate
DH_min=minimum ON duty cycle of Q1-gate
DL_max=maximum ON duty cycle of Q2-gate
DL_min=minimum ON duty cycle of Q2-gate
U1out=see schematic for location of this instantaneous voltage
U2out=see schematic for location of this instantaneous voltage As noted above, a conventional Buck controller 168 which provides a signal at its DH output to control FET 162 to increase the voltage V1 at node 161 of capacitor 160 in the event of power loss, such as the opening of switch 156 or the loss of the power supply 154. In this example, the Buck converter is operated at constant frequency to simplify the operation of the circuit. It should be noted that output DH and output DL of conventional Buck controllers are typically implemented in complimentary logic, i.e., when DH is HI, DL is LO, and, vice versa.

An example process for the operation of hold-up circuit 153 is as follows.

1. Set up Buck converter function from V2 to V1. Set up Buck converter negative feedback loop regulation to regulate V1 to V1bck_reg
   a. Require V1bck_reg<V1nom_min by enough noise margin so no confusion when to Boost or Buck. Simplifies logic design.
   b. When V1<V1 bck_reg, issue DH_max.

c. Require DH_max=1, therefore DL_min=0, to guarantee ability to transfer 0 net energy from V1 to V2.
2. When V1>V1Buck_min, issue DH_min
   a. Require DH_min>0, therefore DL_max<1, to guarantee there will be energy transferred from V1 to V2 without other logical decisions, simplifying control circuit design. (If DL_max=1, energy in inductor will not be allowed to transfer to V2; need to avoid this condition.)
   b. Topology will therefore Boost from V1 to V2, achieve V2>V1.
3. Add feedback loop to sense and regulate V2 such that V2=V2nom.
   a. When V2>V2nom, V2fb>Vref2, U2out pulls LO and reduces V1fb through R5 such that V1fb<Vref1. DH therefore goes to DH=DH_max, DL becomes DL=DL_min, reducing net energy delivered to V2.
   b. Require DH_max=1, therefore DL_min=0, enabling topology to completely cease Boost action from V1 to V2. This allows prevention of over-voltage condition on V2, ensuring V2<or=V2nom.
4. Now, with the control algorithm described above,
   a. as V1 decreases towards V1bck_reg, U2out will move higher to maintain V1fb=Vref1, and V2 will regulate at V2=V2nom, and,
   b. when V1 decreases such that V1<V1bck_reg, and U2out is open-drain therefore no longer reducing V1fb through R5, V1fb will reach V1fb<Vref1, then,
   c. U1out goes HI, controller issues DH_max. Buck action from V2 to V1 ensues. DH will therefore be modulated by controller such that V1=V1bck_reg, and,
   d. if V1 goes to V1>V1bck_reg, system will return to Step 2 state above.

Although various embodiments have been described using specific terms and devices, such description is for illustrative purposes only. As noted above, voltages levels, thresholds, etc. have be used by way of example and not limitation. The words and numbers used are words and numbers of descriptions of examples rather than of limitation. It is to be understood that changes and variations may be made by those of ordinary skill in the art without departing from the spirit or the scope of the disclosure as set forth herein. In addition, it should be understood that aspects of various other embodiments may be interchanged either in whole or in part. It is therefore intended the appended claims be given their true spirit and scope without limitation or estoppel.

What is claimed is:

1. A circuit for increasing DC power supply hold-up time comprising:
   an inductor having a first node and a second node, said first node of said inductor coupled to a positive terminal of a DC power source and a negative terminal of said DC power source coupled to ground;
   a first capacitor having a first node coupled to said first node of said inductor and having a second node coupled to ground;
   a second capacitor having a first node coupled to said second node of said inductor and having a second node coupled to ground; and
   a controller operative to direct current to said inductor such that said inductor can serve as a Boost inductor for said second capacitor and a Buck inductor for said first capacitor;
   wherein said controller has a first input coupled to said first node of said first capacitor to sense a first voltage and a second node coupled to said first node of said second capacitor to sense a second voltage and comprises logic responsive to said first voltage and said second voltage and is operative to develop a first control signal having a first on duty cycle and a second control signal having a second on duty cycle and having a ratio computed as the first on duty cycle divided by the second on duty cycle, said controller being operative in a first mode for adjusting said ratio to maintain said second voltage at a first predetermined voltage, and if said first voltage drops below a predetermined threshold, said controller being operative in a second mode for adjusting said ratio to maintain said first voltage at a second predetermined voltage.

2. A circuit for increasing DC power supply hold-up time as recited in claim 1, further comprising a first valve coupled between said second node of said inductor and said first node of said second capacitor and a second valve coupled between said second node of said inductor and ground.

3. A circuit for increasing DC power supply hold-up time as recited in claim 2 wherein said controller has a first output coupled to said first valve and a second output coupled to said second valve and wherein said first valve is responsive to said first control signal and said second valve is responsive to said second control signal.

4. A circuit for increasing DC power supply hold-up time as recited in claim 1, further comprising a switch coupling said positive terminal of said DC power source to said first node of said inductor.

5. A circuit for increasing DC power supply hold-up time as recited in claim 4 wherein said controller includes a third input coupled to said positive terminal of said DC power source.

6. A circuit for increasing DC power supply hold-up time as recited in claim 5 wherein said switch is an electrically controllable switch, and wherein said controller includes a third output coupled to said electrically controllable switch.

7. A circuit for increasing DC power supply hold-up time as recited in claim 2 wherein said first valve is a first FET and said second valve is a second FET.

8. A Boost/Buck controller comprising an integrated circuit device, said device comprising:
   a first input for sensing a first DC voltage;
   a second input for sensing a second DC voltage;
   logic responsive to said first DC voltage and said second DC voltage and operative to develop a first control signal having a first on duty cycle and a second control signal having a second on duty cycle and having a ratio computed as the first on duty cycle divided by the second on duty cycle, said Boost/Buck controller being operative in a first mode for adjusting said ratio to maintain said second DC voltage at a first predetermined DC voltage, and if the first DC voltage drops below a predetermined threshold, said Boost/Buck controller being operative in a second mode for adjusting said ratio to maintain said first DC voltage at a second predetermined DC voltage;
   a first output coupled to said first control signal; and
   a second output coupled to said second control signal; and
   further comprising a first FET controlled by said first control signal and a second FET controlled by said second control signal, said first FET being coupled to said first output and said second FET being coupled to said second output; and
   said Boost/Buck controller operative to direct current to an inductor such that said inductor can serve as a Boost inductor for a first capacitor and a Buck inductor for a second capacitor.

9. A Boost/Buck controller as recited in claim 8, further comprising a third input for sensing a DC power source voltage level.

10. A Boost/Buck controller as recited in claim 9, further comprising a third output for controlling a power switch.

11. A Boost/Buck controller as recited in claim 8, further comprising a third output for providing an under-voltage alert to begin an orderly shut-down.

12. A circuit for increasing DC power supply hold-up time comprising:
- an inductor having a first node and a second node, said first node of said inductor coupled to a first terminal of a DC power source and a negative terminal of said DC power source coupled to ground;
- a first capacitor having a first node coupled to said first node of said inductor and having a second node coupled to ground;
- a first FET having a source, a drain, and a gate, said source of said first FET coupled to said second node of said inductor;
- a second capacitor having a first node coupled to said drain of said first FET and having a second node coupled to ground;
- a second FET having a source, a drain, and a gate, said drain of said second FET coupled to said second node of said inductor and said source of said second FET coupled to ground;
- a first voltage divider having a first node coupled to said first node of said first capacitor and a second node coupled to ground, said first voltage divider additionally having an output node at a first voltage;
- a Buck controller having an input coupled to said output node of said first voltage divider, said Buck controller having a first output coupled to said gate of said first FET and a second output coupled to said gate of said second FET to control on and off states of said first and second FETs, respectively;
- a second voltage divider having a first node coupled to said first node of said second capacitor and a second node coupled to ground, said second voltage divider additionally having an output node at a second voltage; and
- an operational amplifier having an inverting input coupled to said output of said second voltage divider, a non-inverting input coupled to said first node of said first capacitor, and an output coupled to said input of said Buck controller;
- wherein said Buck controller comprises logic responsive to said first voltage and said second voltage and is operative to develop a first control signal having a first on duty cycle and a second control signal having a second on duty cycle and having a ratio computed as the first on duty cycle divided by the second on duty cycle, and if said first voltage drops below a predetermined threshold, said controller is operative for adjusting said ratio to maintain said first voltage at a predetermined voltage.

13. A circuit for increasing DC power supply hold-up time as recited in claim 12, further comprising a switch coupling said positive terminal of said DC power source to said first node of said inductor, wherein said switch is an electrically controllable switch and said Buck controller includes a third output coupled to said electrically controllable switch.

\* \* \* \* \*